(12) United States Patent
Braun

(10) Patent No.: US 6,341,266 B1
(45) Date of Patent: Jan. 22, 2002

(54) METHOD AND SYSTEM FOR THE MAXIMIZATION OF THE RANGE OF COVERAGE PROFILES IN INVENTORY MANAGEMENT

(75) Inventor: Heinrich Braun, Karlsruhe (DE)

(73) Assignee: SAP Aktiengesellschaft (DE)

( * ) Notice: Subject to any disclaimer, the term of this patent is extended or adjusted under 35 U.S.C. 154(b) by 0 days.

(21) Appl. No.: 09/204,772

(22) Filed: Dec. 3, 1998

Related U.S. Application Data

(60) Provisional application No. 60/089,996, filed on Jun. 19, 1998.

(51) Int. Cl.$^7$ .............................................. G06F 17/60
(52) U.S. Cl. ................................................ 705/7; 705/8
(58) Field of Search ................................ 705/7, 8, 28

(56) References Cited

U.S. PATENT DOCUMENTS

| | | | |
|---|---|---|---|
| 5,712,985 A | * 1/1998 | Lee et al. .................. | 395/207 |
| 5,797,113 A | 8/1998 | Kambe et al. | |
| 5,819,232 A | 10/1998 | Shipman | |

FOREIGN PATENT DOCUMENTS

| | | |
|---|---|---|
| DE | 196 12 652 | 3/1997 |

OTHER PUBLICATIONS

Loren P. Rees et al, "A Linear Goal Programming Model of a Multi–Period, Multi–Commodity Network Flow Problem", Journal of Business Logistics, 1987, p. 117–138.*

James Orlin, "A Faster Strongly Polynomial Minimum Cost Flow Algorithm", Proceedings of the 1988 Twentieth Annual ACM Symposium on Theory of Computing, May 1988, p. 377–387.*

Andrew Goldberg et al, "Solving Minimum–Cost Flow Problems by Successive Approximation", The Nineteenth Annual ACM Conference on Theory of Computing, May 1987, p. 7–18.*

Andrew Goldberg, "Scaling Algorithms for the Shortest Paths Problems", Proceedings of the ACM–SIAM Symposium of Discrete Algorithms, Jan. 1993, p. 222–231.*

Andrew V. Goldberg et al, "An Implementation of a Combinatorial Approximation Algorithm for Minimum–Cost Multicommodity Flow", NECI Technical Report 98–038, Apr. 1998, p. 1–16.*

ILOG Press Release, Jan. 5, 1998, "Manugistics Extends Partnership with ILOG for Supply Chain Management".*

ILOG Press Release, Feb. 12, 1998, "ILOG Planner 2.2 Joins ILOG and CPLEX Expertise".*

ILOG Press Release, Apr. 27, 1998, "ILOG's CPLEX 6.0 Delivers Significant Performance Improvements".*

Konstantin Kogan et al. "Optimal flow control of flexible manufacturing systems: Setup locationization by an iterative procedure", International Journal of Production Economics, Aug. 15, 1997, p. 37–46.*

* cited by examiner

Primary Examiner—Tariq R. Hafiz
Assistant Examiner—Marc Norman
(74) Attorney, Agent, or Firm—Chadbourne & Parke LLP

(57) ABSTRACT

A method and system for managing inventory in a multiple level distribution chain by applying optimization algorithms to a range profile constructed from a formulation of the distribution network and the various elements factored in the network. A formal definition of the optimization problem is defined and several algorithms are proposed for the maximization of the range of coverage profiles. The optimization process minimizes transportation costs and avoid bottlenecks. However, if bottlenecks were to occur, the system prioritizes demands and provides an optimal solution for a monotone distribution of products. The basic function presented involves the steps of initializing the range of coverage profile with a starting value; computing the necessary in-flows necessary to fulfill the profile constraints; constructing the cheapest flow for these demands using a minimum-cost algorithm; and lowering or enlarging the range of coverage profiles until a solution is found.

4 Claims, 9 Drawing Sheets

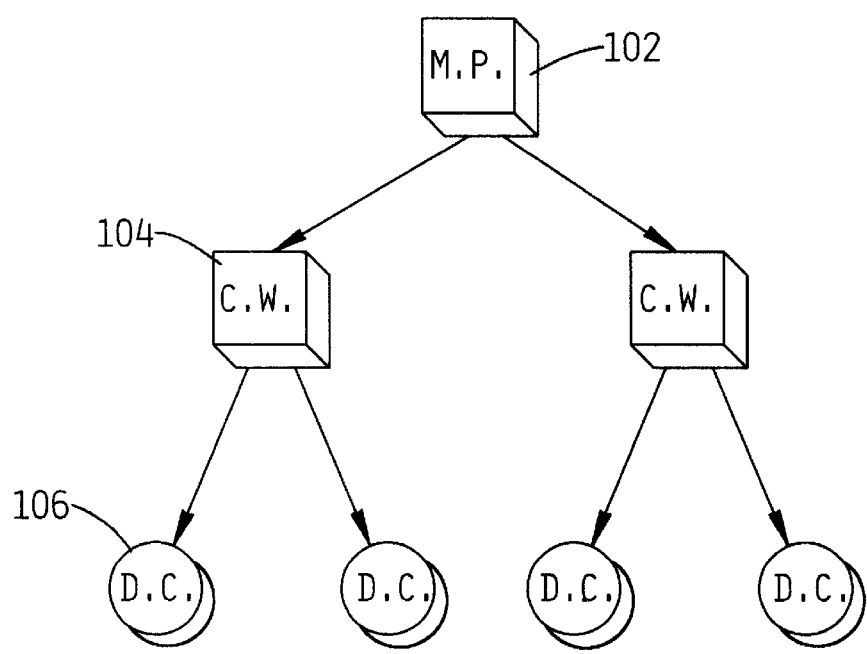
FIG_1
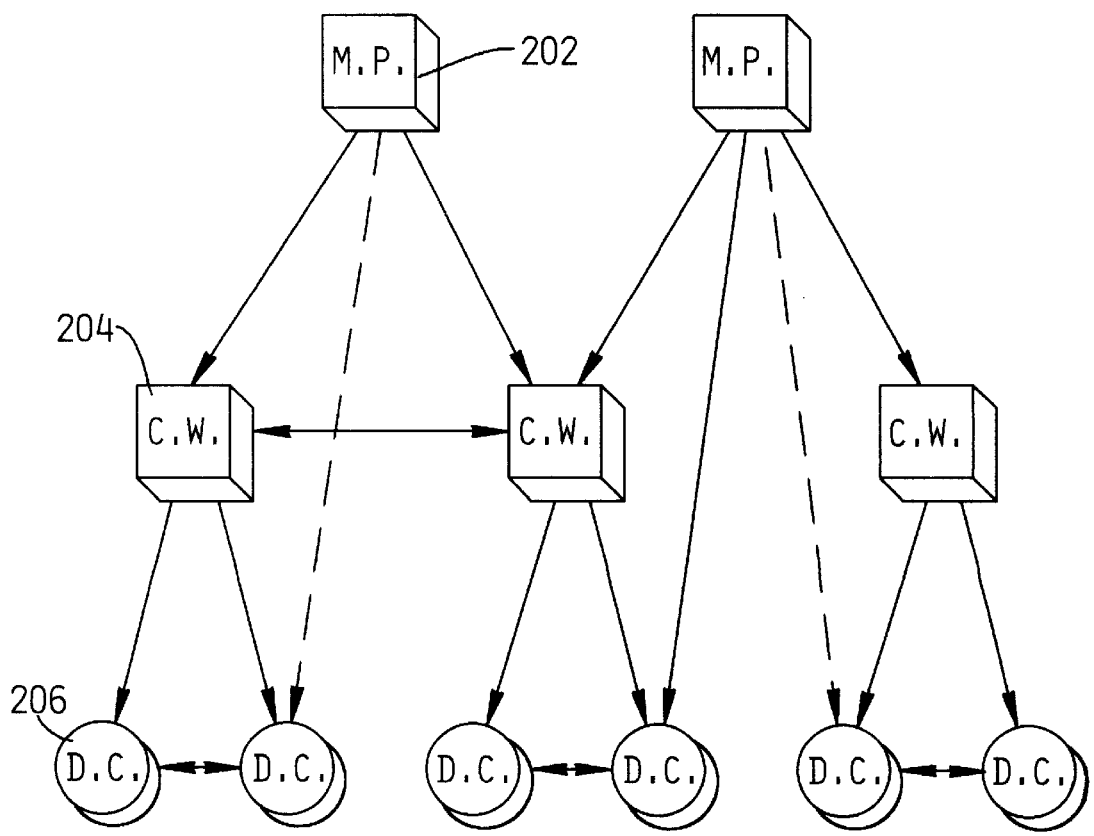
FIG_2

FIG_3
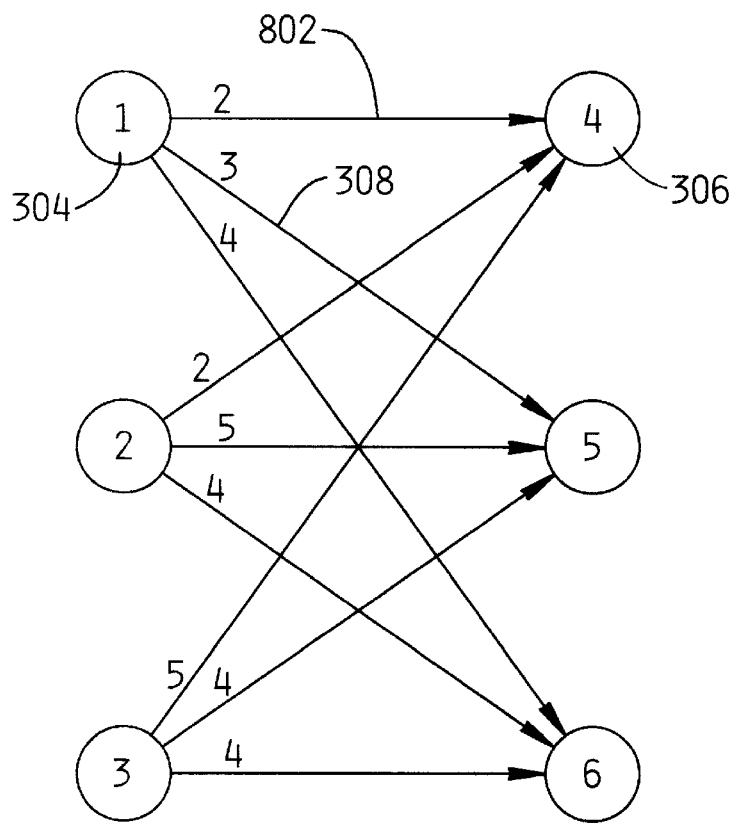
FIG_4
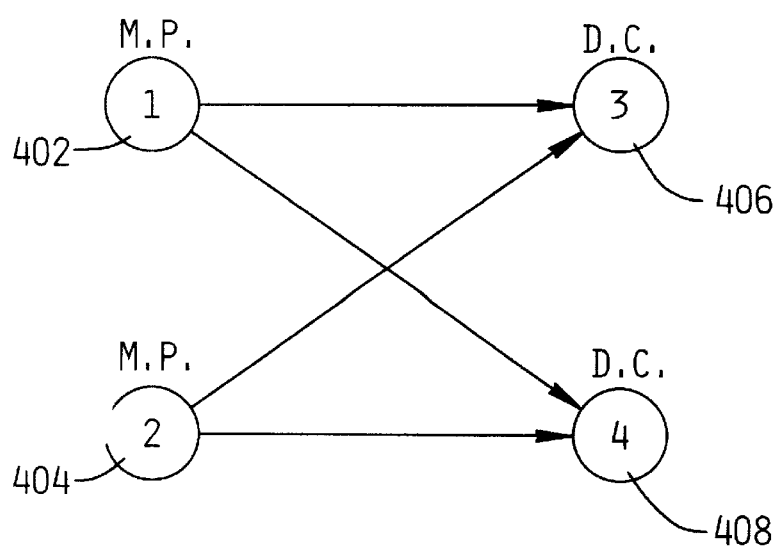

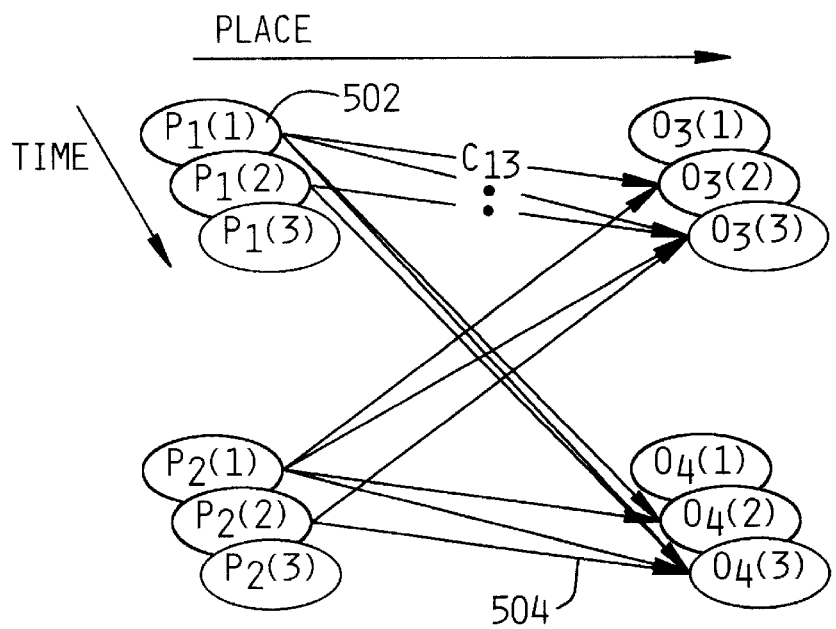
FIG_5
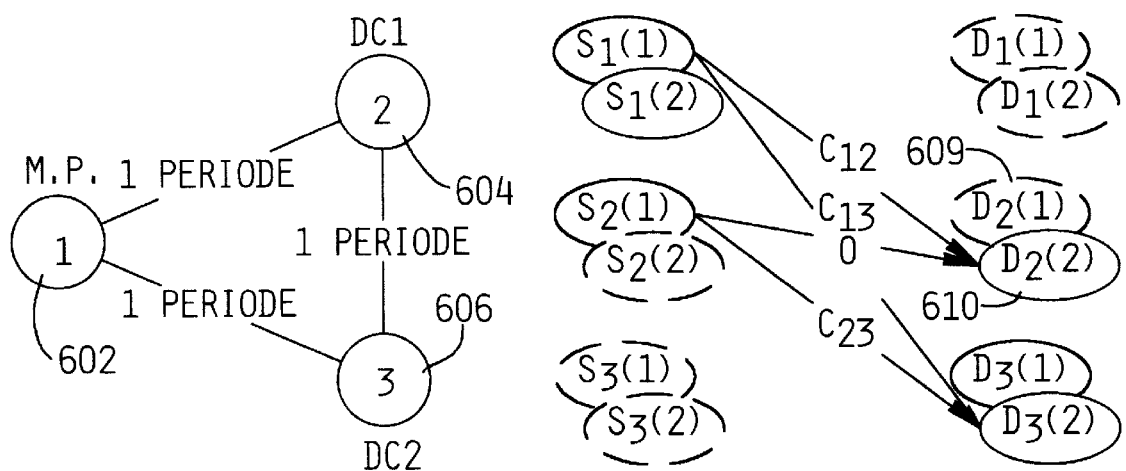
FIG_6  FIG_6a

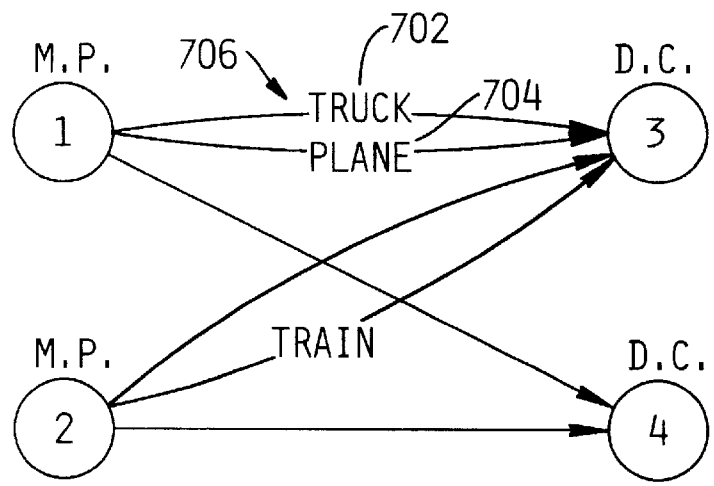
FIG_7
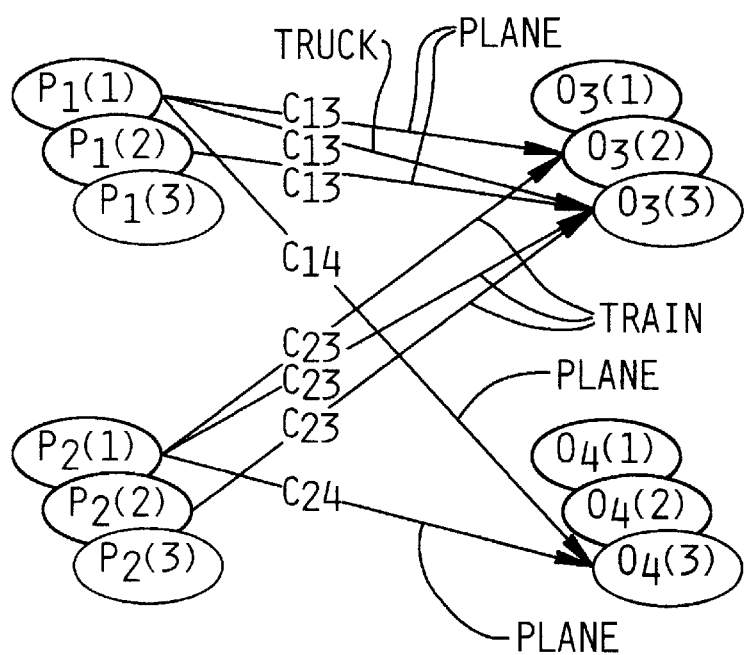
FIG_8

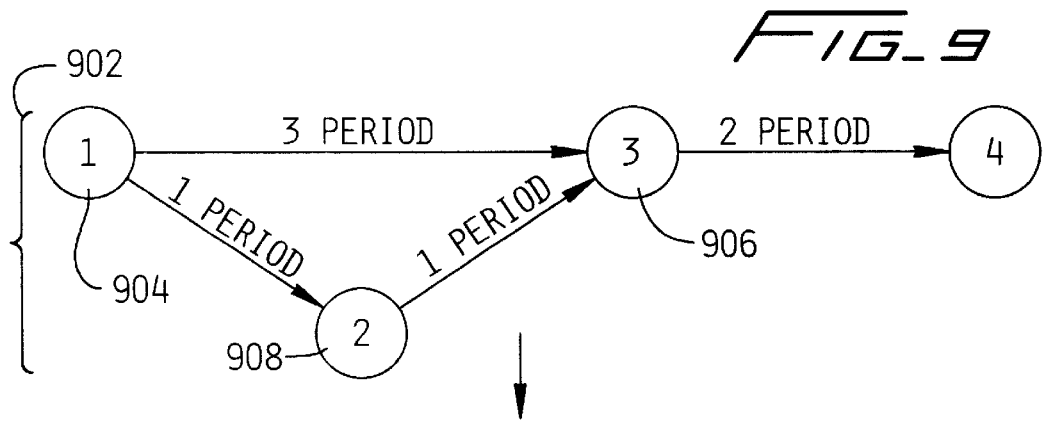
FIG_9
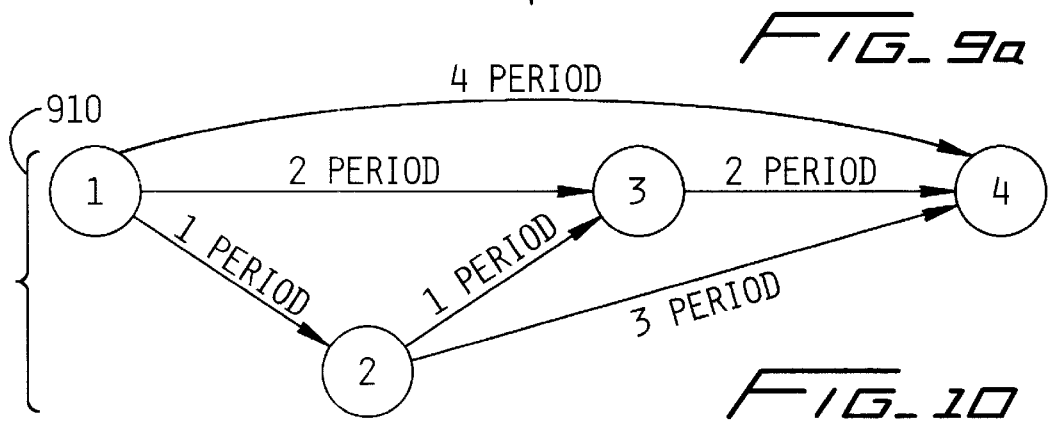
FIG_9a
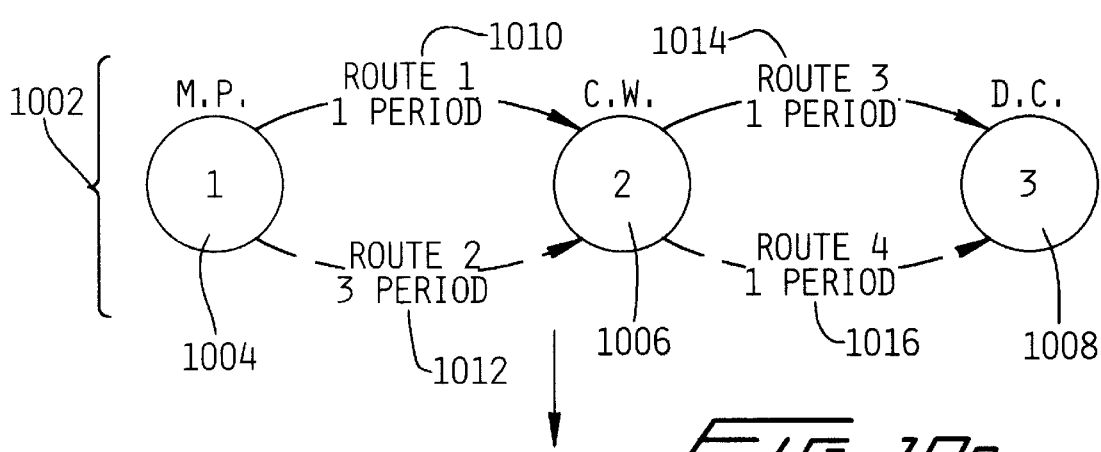
FIG_10
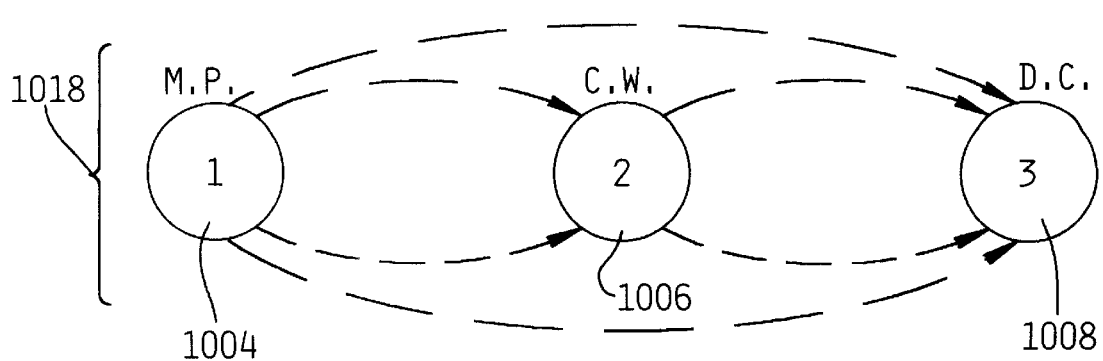
FIG_10a

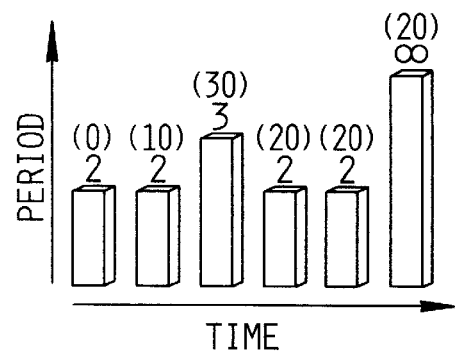
FIG_15
FIG_16
| PERIODE | 1 | 2 | 3 | 4 | 5 | 6 |
|---|---|---|---|---|---|---|
| PW | 30 | 10 | 10 | 10 | 20 | 0 |
| $DZ_1$ | 0 | 0 | 10 | 10 | 10 | 10 |
| $DZ_2$ | 0 | 0 | 10 | 10 | 10 | 10 |
| $Z^M$ | 30 zu $DZ_1$<br>0 zu $DZ_2$ | 0 zu $DZ_1$<br>10 zu $DZ_2$ | 0 zu $DZ_1$<br>10 zu $DZ_2$ | 0 zu $DZ_1$<br>10 zu $DZ_2$ | 10 zu $DZ_1$<br>10 zu $DZ_2$ | 0 zu $DZ_1$<br>0 zu $DZ_2$ |
| Z | 15 zu $DZ_1$<br>15 zu $DZ_2$ | 5 zu $DZ_1$<br>5 zu $DZ_2$ | 5 zu $DZ_1$<br>5 zu $DZ_2$ | 5 zu $DZ_1$<br>5 zu $DZ_2$ | 10 zu $DZ_1$<br>10 zu $DZ_2$ | 0 zu $DZ_1$<br>0 zu $DZ_2$ |
| $R^M$ | 1 | 1 | 1 | 1 | 1 | ∞ |
| $R'^M$ | 2 | 1 | 1 | 1 | 1 | ∞ |
| R | 2 | 2.5 | 2 | 1.5 | 1 | ∞ |

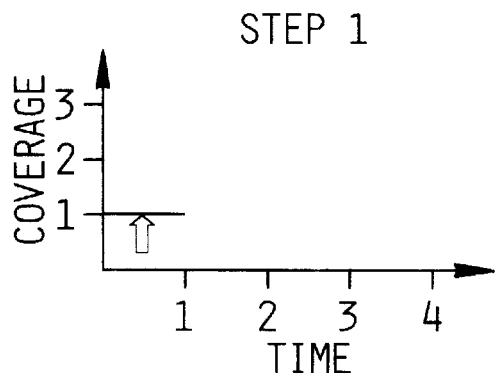
FIG_17
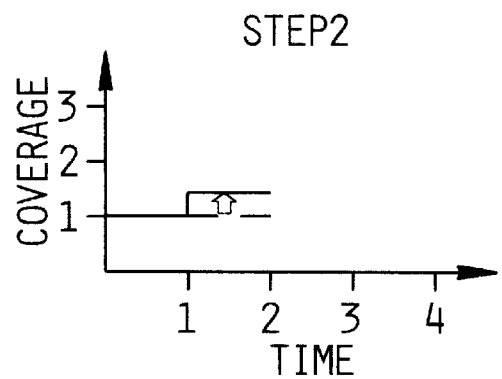
FIG_17a
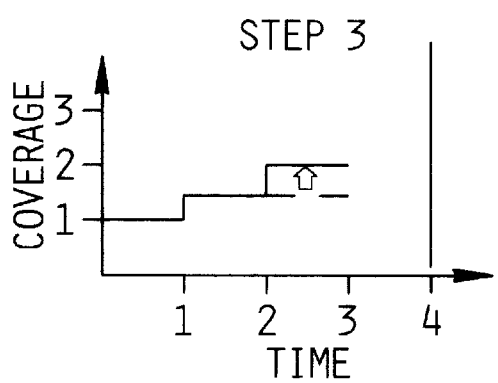
FIG_17b
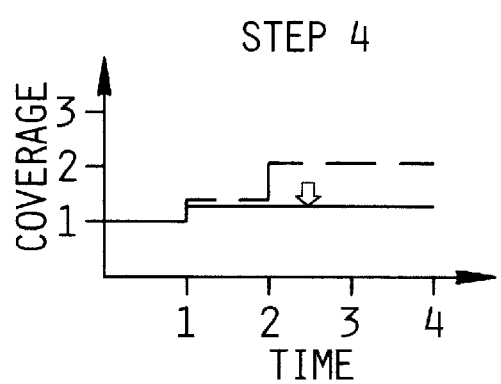
FIG_17c

METHOD AND SYSTEM FOR THE MAXIMIZATION OF THE RANGE OF COVERAGE PROFILES IN INVENTORY MANAGEMENT

CROSS REFERENCE TO RELATED APPLICATIONS

This application is the formal application claiming priority from the U.S. Provisional Application Ser. No. 60/089,996 filed Jun. 19, 1998.

FIELD OF THE INVENTION

This invention relates to methodology for optimization of transportation planning by linear programming, and more particularly, to maximization of the range of coverage profiles for a multiple level transportation network by use of an optimization algorithm to determine shipment and production schedules.

BACKGROUND OF THE INVENTION

A need for allocation of inventory and transportation resources arises in a broad range of industrial areas related to manufacturing and distribution. These allocation decisions are typically subject to constraints such as limitations on equipment, time, cost, storage capacity and other parameters affecting the outcome of a distribution process. As an example of the particular interest herein, there is a need to optimize the distribution and inventory levels of a supply chain where there are multiple production facilities with multiple distribution centers located strategically near customers.

Resource allocation decisions are typically subject to constraints on such allocations. Resources are always limited in overall availability, and, furthermore, the usefulness of a particular resource in some particular application may also be limited. For example, the traffic-carrying capacity of each individual link in a telecommunications system is limited, while the overall traffic offered to the communications system is also limited. Each particular allocation of resources can be associated with a "payoff," i.e., a cost of that allocation or an allocation benefit. The problem, then, is to allocate the resources so as to satisfy all of the constraints and, simultaneously, to maximize the payoff, i.e. minimize the costs or maximize the benefits.

One method of representing such allocation decision problems is known as the linear programming model. Such a model consists of a number of linear relationships set forth in a matrix format, representing quantitatively the relationships among allocations, constraints and the results of the process. In the linear relationships, there is provided the sum of constant coefficients multiplied by unknown allocation values. While many resource allocation problems are not normally represented by such linear relationships, the optimization of transportation processes is still treated as a linear model. Such modeling of linear programming is accomplished in multidimensional space with multidimensional vectors providing a multidimensional figure, or polytope, wherein each facet on a surface thereof is bounded by equations defining relationships among allocated resources in the process. As an example, an optimal solution to the linear programming problem has been obtained by use of the simplex algorithm developed by George Dantzig in 1947, or by the more recent Karmarkar algorithm. There a number of optimization algorithms that are available to solve minimum-cost flow network problems.

Network flow problems are a special case of linear programming. As mentioned before, Dantzig described an efficient polynomial algorithm for solving the minimum-cost flow problem. Although, in 1984, Karmarkar published an efficient polynomial time algorithm for linear programming, the algorithms for the special case of network flow remain much faster.

Network flow algorithms have many applications in industrial planning problems. For example, they can be used in assignment, transportation, minimum-cost flow, shortest path, and maximum flow through network problems. In assignment problems, there is a bipartite graph consisting of a set of productive nodes and consumptive nodes (for example, workers and tasks). The arcs between the workers and tasks are weighted by costs for assigning the worker with the task. The optimization problem in this scenario is the assignment of one task to each worker such that the overall costs are minimized. In transportation problems, there is a bipartite graph where the productive and consumptive nodes are plants and distribution centers. Each plant produce units and each distribution center has a demand for said units. The arcs between plants and the distribution centers are weighted by costs for transporting the units. In this case, the optimization problem is to minimize the transportation costs with the constraint that all demands in the distribution centers be fulfilled. The minimum-cost flow problem is merely the transportation problem with intermediate nodes in the network. Additionally, the arcs may have minimal and maximal capacity. In the shortest path problem, you have a graph with positively weighted arcs. The optimization problem is to find the shortest path between two given nodes in the transportation network. The maximum flow through a network problem is similar to the transportation problem except that the arcs between the nodes have limited transportation capacities but no transportation costs. The optimization problem is to get a maximum flow transported through the network without violating the transport capacities.

However, in the prior art, network flow problems have been limited to networks with nodes and arcs between them, where flow is penalized linearly by transportation costs between them. There is a need for a network flow solution where the minimization of the transportation costs has a lower priority and where maximization of the range of coverage of profiles in the consumption nodes is of primary importance. This problem cannot be formulated as in the prior art as a linear optimization problem or even a network flow problem.

BRIEF SUMMARY OF THE INVENTION

The objective of this invention is to implement a new algorithm for the maximization of the range of coverage profiles in the deployment problem which arises in industrial production planning systems. Several algorithms designed to be applicable to this problem are proposed. The decision on which one is appropriate for a given deployment problem depends on the problem size and the acceptable CPU-time for the computation. This invention proposes a new formulation of the network flow problem takes into account different transport modes, calendar constraints, demand priorities, and fixed flows of production. The algorithmic function is then applied to this formulation. The objective of the algorithm is to select the free variables of the range profile formulation such that, first, the range of coverage profile is maximized and second, the transportation costs are minimized. The proposed algorithm can use any minimum-cost flow algorithm as a basic building block.

BRIEF DESCRIPTION OF THE DRAWINGS

FIG. 1 is a diagram of a simple distribution network.

FIG. 2 is a diagram of a complex distribution network.

FIG. 3 is a diagram of the assignment problem as a bipartite graph.

FIG. 4 is a diagram of a equalized distribution network.

FIG. 5 is a diagram of production and demand nodes with various possible assignments.

FIGS. 6 and 6a depict a diagram of a production plant with supply and demand and corresponding inter-connected supply and demand nodes for the production plant, respectively.

FIG. 7 is a diagram of a distribution network with several modes of transportation.

FIG. 8 is a diagram of an optimized distribution network with several modes of transportation.

FIGS. 9 and 9a are flowcharts of the possible and optimized transport routes, respectively.

FIGS. 10 and 10a are flowcharts of another example of possible and optimized transport routes, respectively.

FIG. 15 is a chart of a global range profile for another possible assignment.

FIG. 16 is an example of a monotone optimal transportation plan.

FIGS. 17, 17a, 17b and 17c depict four steps of a search for the maximum monotone range profile.

DETAILED DESCRIPTION OF THE INVENTION

Figure 11:
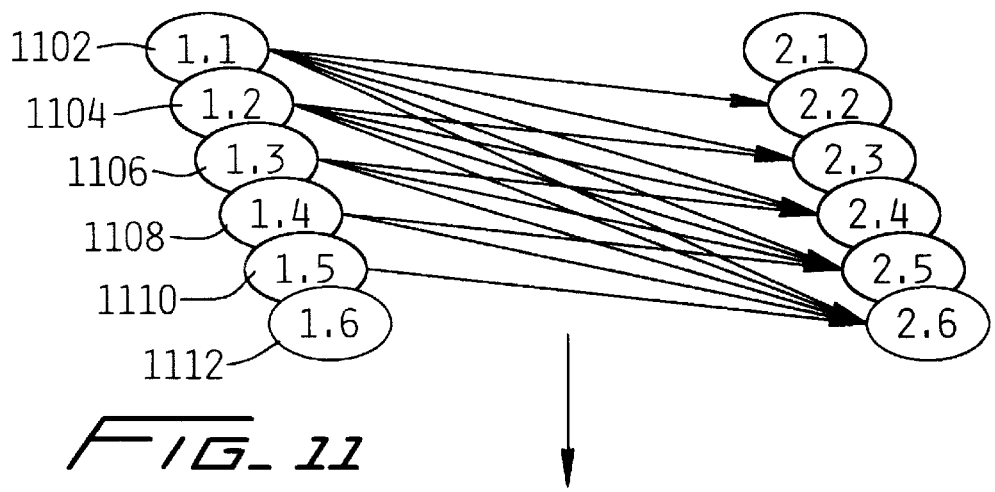
FIGS. 11 and 11a depict the influence of prohibited periods on the possible transportation options in a distribution network.

The present invention presents a planning system for optimizing the flow of goods in complex distribution networks using a new, efficient algorithm. First, the formulation of the planning system is discussed, then the new algorithms to be applied to this formulation are introduced. The starting point in building the scenario in which the algorithm is to be applied, is the assumption that the production volume to be distributed for the time period under consideration is already fixed, and that demand data is also known. The deployment algorithm described here is mainly intended to react to disturbances in the production process or to changes in the distribution process on short notice. The system is well suited for products which are produced in large quantities and for which demand strongly fluctuates. The optimization process presented here attempts to minimize transportation costs and to avoid bottlenecks by forward planning (push distribution). If bottlenecks develop anyway, an attempt at an optimal response (fair share distribution) is made by prioritizing demand.

The basic structure of a system for distributing goods to which this invention may be applied, consists of three elements: manufacturing plants, central warehouses and distribution centers. FIG. 1 depicts the simplest case of a distribution network. In manufacturing plant 102, goods can be produced utilized production facilities with a limited availability. These goods are then placed into intermediate storage 104. In order to shorten the routes to customers as much as possible, and to guarantee fast and cost-efficient delivery, many intermediate storage facilities, or distribution centers 106, are required. The intermediate nodes, or the central warehouses 104, help to achieve larger volume of transportation. The use of central warehouses leads to longer delivery times, but also to lower transport costs. If necessary, a distribution center may also receive a direct delivery. This particular illustration only reflects a schematic structure. In practical operation, network structures may reach much larger dimensions with large number of plants, warehouses, and distribution centers as in FIG. 2 which depicts multiple manufacturing plants 202, central warehouses 204, and distribution centers 206.

The objective of the deployment problem may be summarized as follows. In the typical supply chain, there are sources, sinks, and a transportation network. The sources are plants for which there is a planned production profile. The sinks are the distribution centers for which there is a demand profile (customer orders or forecasted demand). The transportation network consists of arcs with transportation costs and time values between the intermediate nodes. The present invention searches for the optimal assignment of the production (dispersed over space=locations and time) to the demand (also dispersed over space=locations and time) such that the range of coverage profiles is maximized. Two cases are distinguished as mentioned above. In the "Push" case, there are more products than demand, and the products are distributed such that the range of coverage of each increase uniformly. In the "Fair Share" case, there are less products than demand, and the products are distributed such that the more important customers are prioritized and customers of equal priority are treated similarly. Specifically, the system is not allowed to serve customer demand with lower priority before servicing customer demand with higher priority. In the "Push" case, the minimum of the range of coverage profiles is applied to all distribution centers. For the "Fair Share" case, each priority class is considered sequentially and coverage is maximized to serve those high priority demands. Furthermore, if different modes of transportation, transportation paths and sources of supply are available, the entire distribution plan should be optimized toward the lowest possible overall cost.

In the approach to solving the above-described deployment problem, the transportation problem, or assignment problem, plays a central role. The basic assignment problem is defined as follows: in a bipartite graph with an equal number of left and right nodes, each node on the left side should be assigned to a node on the right side so that each node has exactly one partner. The resulting connection ("arc") between two nodes have certain costs. The resulting overall costs should be minimal. FIG. 3 describes the assignment problem as a graph. Arrow 302 represents a possible assignment of source 304 on the left side to sink 306 on the right side. The costs of assignments are written in as values 308 of the arcs. The classic transportation problem is distinct from the assignment problem in that one node on the left side (now called "producer") may be assigned to any number of nodes on the right side (now called "consumers"). The problem to be solved is how to find suitable distribution of materials between the nodes such that the so-called inventory range is maximized. This means maximizing the minimum inventory across all nodes and periods. In addition the solution with the lowest transportation cost should be selected among these solutions. The range of a warehouse is defined as the number of subsequent periods (including the current period), for which the current inventory suffices. A range of 1 thus means that the inventory will cover exactly the demand of the current period.

The development of the problem to which the proposed algorithms should be applied is now described in further detail.

THE CLASSICAL CASE

In the simplest case, consider a simple bipartite network with production plants (PW) on the one side and distribution centers (distribution center) on the other side. In this classical case the deliveries are always made from the plants to the distribution centers and not in the opposite direction. A PW can supply any distribution center. FIG. 4 shows an example with two plants 402, 404 and two centers 406, 408. Normally, one will have substantially more distribution centers than production plants.

A production plant i in period t has a production rate $p_i(t)$. In distribution center j there is a customer demand of $o_j(t)$. The initial inventory of all plants and centers is zero. When the range is set for 1 period (that is, the inventory of a distribution center in a certain period must only suffice for exactly this period), the following situation results: the demand of a distribution center j in period t can be covered by all productions which can be delivered in a timely manner to the distribution center (that is no later than period t). Therefore, in order to cover this demand, the production of all plants i in all periods $t' \leq t - T_{ij}$ (where $T_{ij}$ is transport time) could be used. The transport times in this first example is set uniformly at one period. In transporting one unit of material, a transport cost of $C_{ij}$ is incurred. FIG. 5 shows the situation in our network where the window is extended to three subsequent periods (thereby introducing the additional variable of time into the network computation). The number of periods under consideration will be called the horizon. In this new scenario, every node 502 in the illustration now stands for one day's production or, equivalently, one day's demand. The arrows 504 no longer correspond directly to the transportation paths, but instead, correspond to the logical assignment between a certain unit of production and a very specific unit of demand. Every arc therefore can be clearly identified by the source and target place (i and j) and by the start and end time ($t_i$ and $t_j$). The assignment of a certain amount of material from a node on the left side to a node on the right side is called the flow on the arc. The flow creates costs in the amount of the corresponding transportation costs $C_{ij}$ in the distribution network.

As one can see, this is a classical, simplified transportation problem as it is known from operations research. As such, it can be solved through a standard approach from operations research (for example, the MODI-algorithm, as known in the prior art). Since the actual optimizer works on the level of the transportation problem, the transportation network will be called the optimization network from now on, and the optimizer will be called the transport optimizer. The nodes in the distribution net are referred to as distribution network nodes, the nodes in the optimization network as optimization network nodes, when both are referred to. The nodes in the optimization network are divided into sources and sinks.

This particular case of a distribution network is, however, especially simple because, here, production and demand of the optimizing net correspond exactly to those in the distribution network for a single period. When the range is increased to multiple time periods, this is no longer the case. The exact reflection of these values from the distribution net into the optimizing net will be described in the next section.

FROM THE DEPLOYMENT PROBLEM TO THE TRANSPORTATION PROBLEM IN THE CLASSICAL CASE

In the prior section, the deployment problem was projected onto the transportation problem for a fixed range of one period. Now, the goals is to generalize the projection for any possible range. Since the values of the sinks in the optimizing network already depart from the demand in the distribution net by a range of more than one period and since, as we will later see, the values of the sources can differ from the production values in a distribution network, we further distinguish the data of the optimizing network specifically from the original data in the distribution net. In the optimizing network, we will, in the future, always speak of supply and demand—the terms production and order will always refer to the values in the distribution net. The supply in period t of a node i in the optimizing net is defined to be $s_i(t)$, and the demand is defined to be $d_i(t)$.

Definition of range of coverage

The target inventory $L_i(t)$ in period t for given range R(t), results from the orders of the subsequent periods (the safety stocks $m_i(t)$ is not yet taken into account at this point, but will be):

$$L_i(t) = \sum_{\tau=t+1}^{t+\lfloor R(t) \rfloor} o_i(\tau) + (R(t) - \lfloor R(t) \rfloor) \cdot o_i(t + \lceil R(t) \rceil)$$

Alternative Definition/Generalization of range of coverage

The general statement of the range of coverage can be alternatively written to include a maximization of the multiplicator of the safety stock:

$L_i(t) = o_i(t) + R(t)*\text{safety stock}$ or in general, for any monotone increasing function f with $L_i(t) = f(R(t))$ For the sake of clarity we will consider only the first definition of range of coverage in the following.

In the case of a distribution center, the demand is dependent on the difference of the target inventory $L_i(t) - L_i(t-1)$ (which in turn depends on the range R(t)) and the customer order $o_i(t)$.

Distribution Centers: $d_i(t) = o_i(t) + L_i(t) - L_i(t-1)$

[Remark: $d_i(t) \geq 0 \Leftrightarrow R(t) \geq R(t-1) - 1$ (which should be true)]

The supply of a plant in this simple model corresponds to real production. A plant normally has no demand of its own, that is, it does not have a target range to be reached. Therefore no own demand arises.

Production Plant: $s_i(t) = p_i(t)$

Now the transportation problem as shown in the prior section can be built up. In FIG. 5, we only have to replace $p_i(t)$ with $s_i(t)$ and the $o_i(t)$ with $d_i(t)$.

FROM THE DEPLOYMENT PROBLEM TO THE TRANSPORTATION PROBLEM IN THE GENERAL CASE

The models for projecting the transportation problem shown so far are limited to the essential values. Now a model is created where safety stocks and orders of several priority classes are considered:

$$L_i(t) = m_j + (t + R(t)) + \sum_{\tau=t+1}^{t+R(t)} \sum_{P \leq P_{forecast}} o_j^P(\tau)$$

{generalization for non integer $R(t)$ see above}

Remark: If we take also intransits $tr_i(t)$ (fixed deliveries) into account, then the demand reduces to $d_i(t)=o_i(t)-tr_i(t)+L_i(t)-L_i(t-1)$ Whenever the intransits are large enough this demand may become negative, i.e., this node changes to a supply node with positive supply:

$s_i(t)=-(o_i(t)-tr_i(t)+L_i(t)-L_i(t-1))$

That means that a distribution center may become a supply node (instead of a demand node) at particular time t whenever the fixed delivery $tr_i(t)$ is large enough. In this case such an supply of a distribution center i at particular time t can be assigned to any demand of another node respecting the transportation time. Especially, the transportation time and costs to the future demands of the same distribution center i is set to zero. Initial inventory of distribution centers may be modeled by fixed deliveries $tr_i(O)$ at the begin of the planning horizon. FIG. 6 shows a small network with one manufacturing plant 602 and two distribution centers 604, 606. FIG. 6a shows the inter-connected supply and demand nodes corresponding to the network shown in FIG. 6. In distribution center 1, for example, there is an oversupply in period 1 due to a very large initial inventory. This can now be assigned to the demand of period two 608 or to the demand of distribution center 2.

DIFFERENT TRANSPORTATION POSSIBILITIES

In the prior section, a very simple network with only one transportation means between two nodes was considered. We will now examine the change which results in the process of finding a solution when different transportation methods are available. Different transportation methods does not necessarily mean different transportation means, it may also refer to alternatives in the path (for example in a case of truck transports). The longer path must be worth it, that is, it only makes sense if it incurs lower transportation costs. FIG. 7 illustrates a distribution network with several possible means of transportation such as by truck 702 or plane 704. Different arcs correspond in this case to different means of transportation. The links are always marked with the means of transportation used and with the time 706 of transportation (in periods). For projection onto the optimizing network, one must be aware that every arc is correlated to a maximum transportation duration. For example, for the assignment of a supply from period 1 to a demand in period 2 only a transportation means may be selected which requires no more than one period for completion. In addition, it makes sense to select not just a feasible possibility, but the best possibility. One can then make the fundamental assumption that if a slower transportation means is selected, it is also the cheaper one; otherwise use of such means would be senseless and the transportation means would not need to be taken into consideration. In principle, this addition thus only changes the cost of assignment in the corresponding transportation problem. The linkage to the transportation problem is projected as shown in FIG. 8, which displays an optimization net where there are several modes of transport. The projection of the transportation costs has been expanded by the utilized possibilities of transportation.

TRANSPORTATION OVER INTERMEDIATE STORAGE FACILITIES

This section first considers a case of no more than one possibility of transportation for each direct link between two nodes. Then we consider the change which arises from permitting several alternatives for such link.

INTERMEDIATE STORAGE FACILITIES IN A CASE OF ONE POSSIBILITY OF TRANSPORTATION PER LINK

Up to this point, we only considered a two stage distribution network. The consumers (in this case the distribution centers) were directly supplied by the manufacturing plants. Often, distribution networks also use central intermediate storage facilities. By introducing these facilities, the transportation paths to the distribution centers can now, in part, be bundled together. Deliveries can also be bundled and thus possibly made less expensive. The central warehouse acts as a pass-through station in assist in delivery optimization. Therefore, one can directly assign the production of the plants to the distribution centers. For the duration of the overall transport (via the intermediate storage facility) the sum of the transport time to the central warehouse and from there to the distribution center may be used. Time needed to move in and out of the facilities, if necessary, is already included in the transportation time. Since the priority of the whole exercise is to maximize the range of the coverage profiles of the warehouses, the earliest possible deliveries and therefore short transportation times are very important. For this reason, preference is always given to the fastest path between two nodes even if it is not necessarily the most direct path. If one enters the transportation times into a graph in order to then receive the shortest overall transportation time between two randomly chosen nodes one must also calculate the transitive closure of the graph. FIG. 9 shows an example (on top the given net is projected below the transitive closure that belongs to it) with the shortest transportation time between two nodes. In the flow chart 902 shown FIG. 9, the various transportation routes and times are shown. To get from node 904 to node 906, it takes three periods. However, to get from node 904 to node 906 through node 908, it only takes two periods. Taking this into account, flowchart 910, shown in FIG. 9a, is created, showing the minimum times needed to get between the nodes.

If one has calculated the duration of the fastest path in this manner one then calculates the costs that go with it. These are composed, analog to the times, of the sum of the cost for each part of the path. If there are several fastest paths, the cost of the most efficient among them are utilized.

INTERMEDIATE STORAGE FACILITIES IN A CASE OF ALTERNATIVE POSSIBILITIES OF TRANSPORTATION FOR EACH LINK

As explained before, one can also consider alternative arcs in the distribution network. In transport over intermediate nodes the question arises which arc should be used for the different segments. If one permits all combinations, then in a case of several intermediate nodes, one very quickly arrives at many possibilities of transportation between the final nodes. Upon closer examination, however, one will find that not every one of these arc combinations make sense. Normally, for example, one would not use an express connection in a first segment and a slow connection in a second. For this reason, the following method has been selected for entering the connections. First, one specifies the number of the maximum permissible transportation modes in the net. The transportation modes here correspond to different speed classes (for example regular and express). Now, if a direct connection is to be defined between two nodes, then for each transportation mode (i.e., speed, class, etc.), one states the cost and duration. The optimizer then calculates the best path as described in the last section separately for each class. This data is then used in the optimization network. In paths with several segments, the transportation modes are not mixed together. If one nevertheless would like to permit only one possibility of transport on a given arc, one simply provides the same data for all transportation modes. FIGS. 10 and 10*a* show an example. FIG. 10 depicts the network as is, while FIG. 10*a* depicts the network as created by the optimizer. Path 1002 shows manufacturing center 1004, central warehouse 1006, and distribution center 1008. It displays route 1 1010 via train which takes 1 period, route 2 1012 via truck which takes 3 periods, route 3 and 4 1014, 1016 via plane which takes 1 period. The arcs of the normal modes are shown with dots, the arcs of the express modes are shown with lines. Between nodes 2 and 3 there exists only one real connection, which is transportation by plane. Path 1018 shows the paths compressed by the optimizer between the manufacturing center 1004, central warehouse 1006, and distribution center 1008.

PROHIBITED PERIODS

Figure 11A:
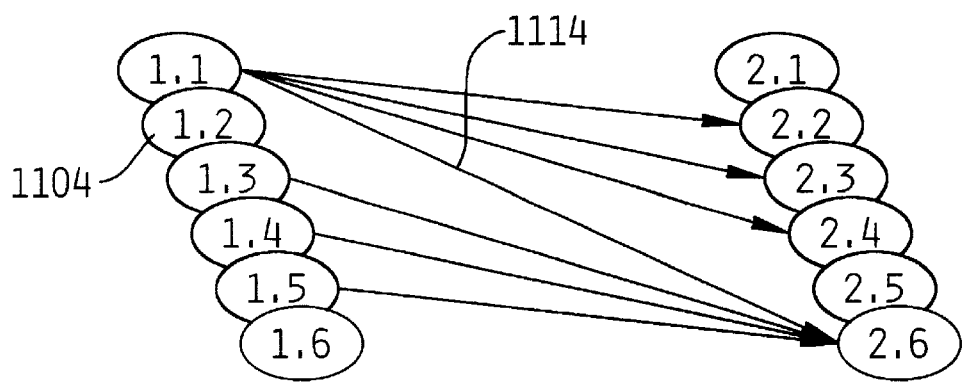

Now we will discuss implementation of prohibited arcs to further develop our proposed model. Every transportation connection and every distribution node can be provided with a list of prohibited periods. Prohibited periods are windows of time such as holidays on which transportation rests or on which no goods can be accepted or given out. We recall the classical case described above where every node in the optimization net stands for one point of origin i, a starting particular time $t_i$ and a target place j and a target particular time $t_3$ of a certain material assignment. In order to take holidays into account every arc is pushed into the future until $t_i$ falls on a permitted period for giving out goods at node i (that is, a common delta of time is added to both the start time and target time). After this, $t_j$ is also shifted until the sum of the permitted transportation periods between $t_i$ and $t_j$ are sufficient for the corresponding transport and until $t_j$ no longer falls on a prohibited period for accepting goods at node j. FIGS. 11 and 11*a* depict optimizing network with a horizon of six periods 1102, 1104, 1106, 1108, 1110 and 1112. The nodes are marked with the distribution network node number i and the corresponding period number $t_i$. The prohibited periods are in each case shown in gray. In period two, therefore, there is a prohibition against shipping goods in distribution net node 1. Accepting products from node 2 in period 5 is "prohibited". Transportation is prohibited in period 3 1114. The described distribution of the prohibited periods is of course an extreme case. In most cases the holiday will at least affect the areas receiving goods and giving out goods at the same time.

THE SEARCH FOR THE MAXIMUM RANGE PROFILE

The aim of this invention is to supply the distribution centers of the demand nodes with the available material such that the range profile of the inventory is maximized. The task, therefore, is to find a suitable assignment from the supply nodes to the demand nodes. So far we have seen how one can determine an assignment to a given range profile which meets the prior stated conditions (minimal transportation costs taking into account holidays etc.). This is done by a projection of a transportation problem and solution of the same utilizing an efficient transportation algorithm, for example, the MODI-algorithm, which can serve as the basis for the enhanced algorithm proposed by the present invention. In the following we define the problem of maximizing the range of coverage.

MAXIMIZING THE RANGE OF COVERAGE FOR OVERSUPPLY

Oversupply means that the planned for customer demand can be completely met. The transport optimizer thus has found a solution for a minimum range profile of one period across all distribution centers and points in time. Now the range profile must be maximized. At first glance the only option is to try out different profiles with the given possibilities and to gradually work one's way toward the optimum. This is simply a trial and error method. In principle, this is also the only method to find the optimum. Certain assumptions about the existing supply and demand situation which do not restrict the general validity of the process excessively can, however, greatly speed up the search. However, one must accept a risk of not always finding an optimal solution. Before we go into more detail, we should answer the question: What is to be understood under a maximum range profile?

WHAT DOES A MAXIMUM RANGE PROFILE LOOK LIKE?

If one wants to describe a range of all distribution centers in the network, one would need to describe the range profile for each individual distribution center. However, because the goal is to even out the ranges between the warehouses at a given particular time as much as possible it will suffice to speak of only one global range profile which is valid as a lower bound for each distribution center. Stated more clearly, the global profile R(t) is the minimum for the local profile $R_i(t)$ over node i.

Figure 12:
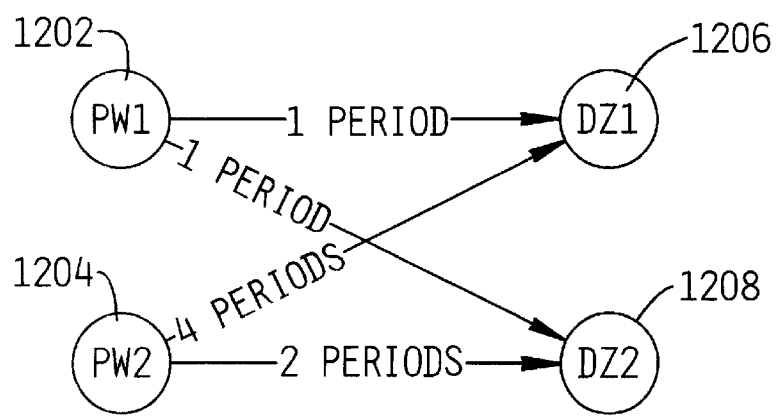
FIG. 12 is a diagram of a simple distribution network with time values on the arcs.
Figure 13:
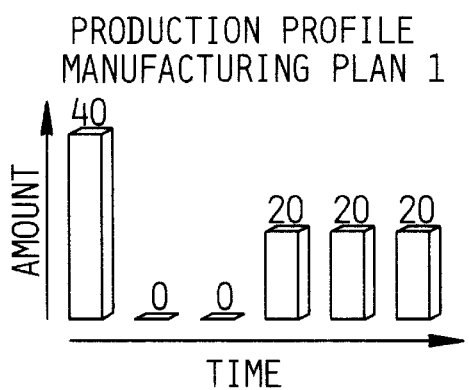
FIGS. 13, 13a, 13b and 13c are diagrams of the production and demand profiles of a distribution network for the manufacturing plant 1, manufacturing plant 2, distribution centent 1 and distribution center 2, respectively.
Figure 13A:
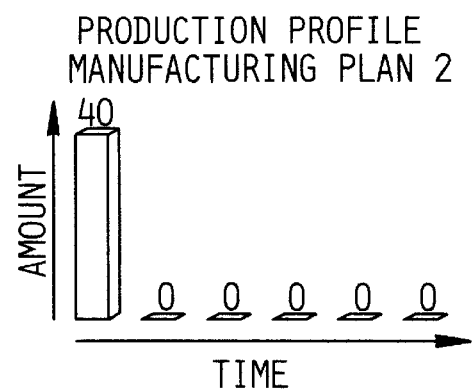
Figure 13B:
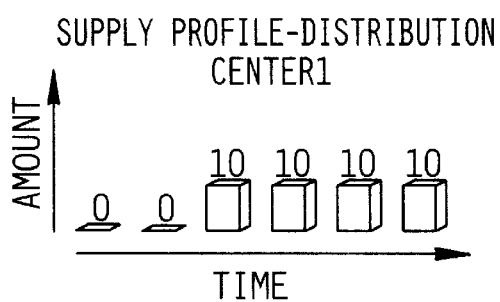
Figure 13C:
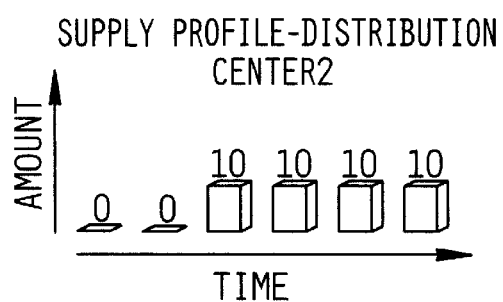

The local profiles may at times lie above the global profile; they may, however, never lie below it: $R(t)=\min_i \{R_i(t)\}$. As was the case before, we will in the future only speak of the range profile (which refers to all distribution centers). Intuitively, one would think the maximum range profile to be that profile which is at a maximum in each period. However, it is not that simple. The maximum range in a certain period may depart significantly from ranges of other periods which precede it. FIG. 12 shows an example network with two manufacturing plants and two distribution centers. On the arcs the corresponding transportation times are written in.

Figure 14:
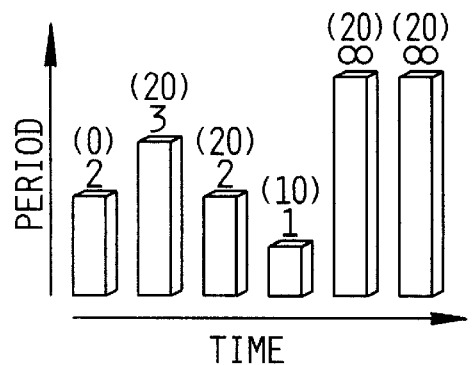
FIG. 14 is a chart of a global range profile for one possible assignment.

The production and demand profiles of the manufacturing plants 1 and 2 and distribution centers 1 and 2 are shown in FIGS. 13, 13*a*, 13*b* and 13*c*, respectively. The example is structured according to the simple model of a distribution network and does not include any safety stocks, initial inventories or fixed deliveries. All the demand classes are of equal priority, and there is only one transportation mode. For the following consideration of the range profile this simple model is always used. The maximum possible global range in a certain period is the range which both distribution centers can reach simultaneously in that period. In period two it has a value of three. This value is reached only then when one assigns the production of the first period from plant one (40 units) in equal parts to the distribution centers. Plant two has no influence on the range in the second period because the material from this plant can be delivered no earlier than the third period. In this assignment, a range of one automatically emerges in the fourth period for distribution center 1 since this distribution center is only reached by manufacturing plant 2 in the fifth period and since the initial production of manufacturing plant 1 is already "used up." FIG. 14 shows the maximum global range for this first assignment. The minimum inventory over both centers at the onset of each period is shown in brackets. An infinite range always results when the inventory is sufficient at least for all following periods since for periods beyond the horizon the demand of zero units is assumed.

If one now would like to raise the global range in period 4 from 1 to 2 the following assignment results. Of the 40 units produced by plant 1 in period 1, 30 units are assigned to distribution center 1 and 10 units to distribution center 1. Of the 40 units of the first period in plant 2, one assigns at least 20 units to distribution center 2. With a suitable distribution of the remaining production of plant 1 (for example in equal parts to both centers) the global range shown in FIG. 15 is reached.

This assignment has the additional advantage that the minimum of the global range has increased over all periods from 1 to 2. This example demonstrated that it is not always beneficial to build up the greatest possible global range at the onset. Sometimes this destroys the possibility of evening out the global range at a later point. This process of evening out the inventory is desirable in every case in order to achieve an overall good profile. The range profiles must thus be ranked such that range profile number 2 is evaluated as better than profile number 1. It is not sufficient to compare only the global minimum of the profiles (as one might think) since the other periods (in which a range may lie barely above the minimum) are not considered in a comparison. We therefore define the following ranking for the global range profile:

Ranking for the global range profile: The following applies to two global range profiles $R_1$ and $R_2$:

$$R^1 > R^2 :\Leftrightarrow \min\{R^1(t) R^1(t) \neq R^2(t)\} > \min\{R^2(t)/R^1(t) \neq R^2(t)\}$$

To demonstrate the completeness of this ranking, one must also demonstrate the unitary quality, that is, if two elements cannot be compared (the profiles have the same minimum at different points) there is always an element which is larger than these two.

THE MONOTONE RANGE PROFILE

It is very time-consuming to find the optimal range profile with the methods at hand (trial and error methods). One could for example imagine the following method: beginning with a minimum uniform range of 1 at every particular time, one increases the range in period 1 by a small delta. If a solution is found, then one increases the range in period 2 also and so forth. Once all the periods are done, the process begins again with the first period. If the range cannot be increased in a certain period, one excludes that period from the increases in the further iterations. The time complexity of this approach is bounded by $O(R_{max}/R_{min} \cdot H)$ calls of the transport optimizer, which may be too time consuming [with $R_{max}$ being defined as the optimal range which may occur in the period, $R_{min}$ being defined as the precision, or granularity, with which this range is to be determined, and H for the horizon. In this case, the optimizer always must optimize the data of the entire horizon.]

For this reason we consider first monotone range of coverage profiles. In a second step we enhance this approach to non monotone range of coverage profiles. Since in a monotone increasing function, the minimum always lies at the beginning, the profile which is the maximum one among the monotone increasing profiles, is the first (with the smallest t) to reach a larger value than the other profiles. A transportation plan which is calculated on the basis of the maximum monotone range profile is very good, however, it is unfortunately not always optimal. An example will demonstrate this. FIG. 16 shows a possible situation in a distribution network with one plant and two distribution centers. The transportation time uniformly is one period.

The maximum monotone range profile $R^M$ 1602 has a value of 1 in every period (except for the last period since for demand of periods beyond the horizon, the value 0 is assumed) since no larger range is possible in period 5. The table shows the plan which emerges from assigning the supply to the demand in the optimization net when delivery starts immediately. At $Z^M$ 1604, for example, the production of 30 units in the first period is assigned to the first 3 demands of distribution center 2. If all 3 assigned deliveries commence immediately (in the production period, that is, this first period) then a total transport of 30 units takes place to distribution center 2. The transportation plan set $Z^M$ 1604 is sufficient for the maximum monotone range profile; but it creates an actual global range (that is, the minimum of the actual ranges of the distribution centers) of $R'^M$ 1606 which is smaller than the maximum possible range R 1608 (in the case of assignment Z). In other words, plan $Z^M$ 1604 is very good for the maximum monotone range (it is monotone optimal) but is not fully optimal.

Returning to the search for a maximum monotone profile, we should focus on the starting point as the area of main interest for the assignment. Therefore we are searching for an optimal transportation plan for the first period. The assignment of supply of the first period should not have a negative effect on the range in all periods. The following assumption can substantially reduce the effort of such a search according to this plan. In order to obtain the monotone optimal transportation plan of the first period it is sufficient to restrict the search for the maximum range profile to such profiles which are uneven only in the initial range, that is, at $t \leq \max_{ij}\{T_{ij}\}$ with $t_{ij}$ transportation time between nodes i and j. One need only increase the range profile up to a period of the maximum transportation time; in all following periods the profile may have a constant value.

If one does not consider the entire horizon H in establishing the optimization network but only the periods $t \leq H_{short}$ up to a particular time $H_{short} < H$, that is, if one only considers supply and demand $s_i(t)$, $d_i(t)$ when $t \leq H_{short}$, the optimization network then yields a maximum range profile $R_{max}^{short}$ which in every period is at least as large as the maximum profile $R_{max}$ over the entire horizon:

$$\forall \leq H_{short} : R_{max}^{short}(t) \geq R_{max}(t).$$

RAPID RANGE PROFILE SEARCH

Now that we have defined the short horizon, let's shorten it to one period. The resulting optimization network (which only makes sense if it is possible to execute the transport in one period) is very small and the arc flows can be calculated very rapidly. The maximum range in period 1 can be located by a binary search. In the next step, the second period is added and an attempt is made to locate a maximum range profile over both periods. In doing so, we maintain the range profile from the first step (which so far applies only to the first period) and we initialize the second period with the value of the prior period (in this case the first). If we find a solution for this profile then the range of the second period can be maximized again using a binary search, etc. If for a short horizon, $H_{short}$, range $R(H_{short})$ of $R(H_{short}-1)$ is taken over, that is, if no solution is found, then the range in period in $H_{short}$ is lowered by one period. The resulting profile is of course always kept monotone, that is, in all periods t<$H_{short}$ the range is set to $R(t)=\min\{R(t),R(H_{short})\}$. Now, at the latest, a solution must be possible since a range of $R(H_{short})=R(H_{short}-1)-1$ results from range $R(H_{short}-1)$ (from the definition of the range) in period $H_{short}$. Now we again attempt to increase the value of this and the following periods, beginning with the first period in which a range was changed during this step. The horizon under consideration remains $H_{short}$. If one finally has reached $T=\max_{ij}\{T_{ij}\}$ with the short horizon then in the next step all subsequent periods are treated as a single period. The horizon under consideration is expanded to the overall horizon and all following periods are set to the value $R(H_{short})$. After this step the procedure is completed. The maximum monotone profile has been located. It increases up to point $t_{max}$ and later remains constant.

FIGS. 17–17c show an example of such a search with this process, respectively depicting four steps of this search. Step 4 1702, shown in FIG. 17c depicts a step backward. The range in period 4 cannot be maintained at the value of period 3 and therefore it is reduced to a value of 1.25. All prior periods with a larger range are reduced to this range. Following one again attempts to increase the range of the affected period. Beginning in step 7, one can again proceed normally. In every step the maximal value found for the range in the last period of the horizon currently under consideration, that is, $R(H_{short})$ constitutes an upper limit for the range which can possibly be achieved in this period. Since the maximum monotone profile also tolerates transportation plans which make it impossible to achieve a general maximum profile (for example in this section) one can use these border values in order to make visible a possible mistake in the calculated monotone profile and possibly react to it interactively.

If Opt (H) is the runtime of the transport optimizer for horizon H then the run time of the worst scenario is:

$$O(\log(R_{max}/R_{min}) \cdot T_{max} \cdot Opt(H_{total}))$$

$r_{max}$ is the maximum range which can occur in a period, $r_{min}$ is the precision (granularity) with which this range can be determined, $t_{max}$ is the maximum transportation time between two nodes (with the slowest transportation mode) and $H_{total}$ is the entire horizon (for the overall run time including the run time for the transportation optimizer).

In practical application it turned out that a step backward was rarely necessary. If one takes a point of departure that bottlenecks are more likely to occur at the beginning and that production volume overall slightly exceeds demand volume (push-distribution) then in the last step (in which all periods at $T_{max}$ are incorporated into the optimization net) no step back takes place and the transport optimizer is only called up $\log(r_{max}/r_{min})$ for the entire horizon. Then, taken together with the effort for the initial range, the following run time results:

$$O(\log(R_{max}/R_{min}) \cdot (T_{max} \cdot Opt(T_{max}) + Opt(H_{total})))$$

The method shown here will quickly generate a monotone optimal transportation plan for the first period.

INSUFFICIENT SUPPLY

The prior section assumed that production always suffices to cover all demands in a timely manner. This of course is not always the case. If there is insufficient supply then the demand situation must be lightened in a suitable manner. This can be done in one of two ways: first, the demand itself can be reduced, that, is a few customer orders are only partially or not at all filled. Second, a delay in the completion of the orders is permitted. Of course one can combine both variants. A combination would make sense especially when insufficient supply is not merely a short term issue, that is, when production generally lies below demand. In this situation, delays without demand reductions would continue to accumulate.

REDUCTION IN DEMAND

Let's now turn to the first case (no delay). In order to shorten the demand in a suitable fashion we introduce different priorities for customer orders. An order $o_i^P(t)$ of distribution net node i in period t is now additionally marked with a priority P. The unimportant priority classes (i.e., orders in those classes) are cut back until the volume of material at hand suffices to satisfy the remaining orders on time. We use the same approach as above. The integer part $\lfloor R(t) \rfloor$ specifies the number of priority classes, whose orders are completely fulfilled. The rational part $R(t)-\lfloor R(t) \rfloor$ is the part fulfilled from the next priority class. For example we could define 4 priority classes:

1. $P_{high}$: Demands of customer with high priority.
2. $P_{normal}$: Demands of customer with normal priority.
3. $P_{low}$: Demands of customer with low priority.
4. $P_{forecast}$: Additional demand which is only forecasted but not yet ordered by a customer.

A range of coverage $R(t)=2.7$ would mean that we fulfill all demands for high and normal prioritized customers at time t. For the low prioritized customer we fulfill only 70%.

Our definition of maximal range of coverage profile guarantees, that no demand of higher priority is not fulfilled in favor to a demand of lower priority.

DELIVERY WITH DELAY

In the above considerations no delayed delivery was allowed. That means whenever an order could not be delivered in time it was not delivered at all. Example: If we have a demand of high priority for t=1 and a demand of low priority for t=2 and given that the first supply arrives at t=2 then the demand with low priority will get all supply, but the demand with high priority nothing.

This problem could be solved by introducing additional arcs with reduced transportation time: Delivering with delay $\Delta$ is equivalent to reducing the according transportation time by $\Delta$. For these arcs we have to define the costs of these delay arcs. A possible choice is $$penalty = \Delta^{*2} C_{max}$$

$\Delta$ represents the delay and $C_{max}$ the maximum cost of the arcs without a delay.

The term 2 $C_{max}$ guarantees that a delay could not be prevented by a swap, i.e., exchanging the assignment $s_i(t_i) \rightarrow d_j(t_j)$ and $s_i'(t_i') \rightarrow d_j'(t_j')$ by $s_i(t_i) \rightarrow d_j'(t_j')$ and $s_i'(t_i') \rightarrow d_j(t_j)$ If there are no delays in the exchanged assignments then their costs are $\leq 2C_{max} < \Delta^2 + 2C_{max}$ and thus cheaper than the assignments with a delay. Therefore, the optimizer will never produce a solution with a delay which could be prevented by a swap. Similarly, the term $\Delta^2$ guarantees that a long delay could not be shortend by a swap.

MATHEMATICAL DESCRIPTION OF THE PROJECTION OF THE DEPLOYMENT PROBLEM INTO THE TRANSPORTATION PROBLEM

In this section the illustration of the deployment problems shown so far with regard to the transportation problem will be summarized one more time in mathematical form.

CASE 1
OVERSUPPLY PRIOR CALCULATION

One first must calculate production and demand of the optimization network:
Distribution Centers:

$$D_i(t) = \sum_P o_j^P(t) - tr_j(t) + L_j(t-1) - L_j(t)\}$$

If $D_i(t) > 0$
Then $d_i(t) = D_i(t)$ {demand node}
Else $s_i(t) = =D_i(t)$ {supply node}
with target warehouse inventory of the distribution centers:

$L_i(t) = (1-R(t)-\lfloor R(t) \rfloor)) \cdot L'_i(t, \lfloor R(t) \rfloor) + (R(t)-R(t) \rfloor) \cdot L'_i(t, \lceil R(t) \rceil)$ $$L'_j(t, r) = m_j(t+r) + \sum_{\tau=t+1}^{t+r} \sum_P o_j^P(\tau)$$

Manufacturing plants:
$s_i(0) = p_i(0) + L_i^{initial}$
$\forall t > 0: s_i(t) = P_i(t)$

THE OPTIMIZATION PROBLEM

Minimize:

$$\text{transportation costs} = \sum_{i,j} \left( \sum_{t_j - t_i \geq T_{ij}^{D_{fastest}}} y_{it_i, jt_j} \cdot C_{ij}^{D_{fastest}} + \sum_{D < D_{slowest}} \sum_{T_{ij}^D \leq t_j - t_i < T_{ij}^{slower(D)}} y_{it_i, jt_j} \cdot C_{ij}^D + \sum_{t_j - t_i \geq T_{ij}^{D_{slowest}}} y_{it_i, jt_j} \cdot C_{ij}^{D_{slowest}} \right)$$

With the following auxiliary conditions:

Supply constrained: $\forall i : s_i(t_i) = \sum_{j,t_j} y_{it_i, jt_j}$

Demand constrained: $\forall j : d_j(t_i) = \sum_{i,t_i} y_{it_i, jt_j}$

CASE 2A
REDUCTION OF DEMAND IN A CASE OF INSUFFICIENT SUPPLY PRIOR CALCULATION

Production and demand of the optimization net must again be calculated first:

Distribution Centers:

$$D_j(t) = \sum_{P \leq P_{\lfloor R(t) \rfloor}} o_j^P(t) - tr_j(t) + L_j(t-1) - L_j(t)\}$$

If $D_i(t) > 0$
Then $d_i(t) = D_i(t)$ {demand node}
Else $s_i(t) = -D_i(t)$ {supply node} with target warehouse inventory of the distribution centers:

$L_j(t) = (1-R(t)-\lfloor R(t) \rfloor) \cdot L'_i(t, \lfloor R(t) \rfloor) + (R(t)-\lfloor R(t) \rfloor) \cdot L'_i(t, \lceil R(t) \rceil)$ $$L'_j(t, r) = \sum_{\tau=t+1}^{t+r} \sum_{P \leq P_{\lfloor R(t) \rfloor}} o_j^P(\tau)$$

Remark: The integer part $\lfloor R(t) \rfloor$ specifies the number of priority classes, whose order are completely fulfilled. The rational part $R(t) - \lfloor R(t) \rfloor$ is the part fulfilled from the next priority class.

Manufacturing plants:

$s_i(0) = P(0) + L^{initial}$ $\forall t > 0: s_i(t) = P_i(t)$

THE OPTIMIZATION PROBLEM

Minimize:

$$\text{transportation costs} = \sum_{i,j} \left( \sum_{t_j - t_i \geq T_{ij}^{D_{fastest}}} y_{it_i, jt_j} \cdot C_{ij}^{D_{fastest}} + \sum_{D < D_{slowest}} \sum_{T_{ij}^D \leq t_j - t_i < T_{ij}^{slower(D)}} y_{it_i, jt_j} \cdot C_{ij}^D + \sum_{t_j - t_i \geq T_{ij}^{D_{slowest}}} y_{it_i, jt_j} \cdot C_{ij}^{D_{slowest}} \right)$$

With the following auxiliary conditions:

Supply constrained: $\forall i : s_i(t_i) = \sum_{j,t_j} y_{it_i, jt_j}$

Demand constrained: $\forall j : d_j(t_i) = \sum_{i,t_i} y_{it_i, jt_j}$

CASE 2B
DELAY WITH UNDERSUPPLY PRIOR CALCULATION

Again production and demand of optimization net must be calculated first in the same manner as above, only the optimization function changes by penalizing the arcs with delay. We may also limit the delay by introducing only these additional arcs with an acceptable delay.

THE OPTIMIZATION PROBLEM

Minimize:

Cost = transportation cost + delay penalty $$\text{Transportation cost} = \sum_{i,j} \left( \sum_{t_j - t_i \geq T_{ij}^{D_{fastest}}} y_{it_i jt_j} \cdot C_{ij}^{D_{fastest}} + \sum_{D < D_{slowest}} \sum_{T_{ij}^{D} \leq t_j - t_i < T_{ij}^{slower(D)}} y_{it_i jt_j} \cdot C_{ij}^{D} + \sum_{t_j - t_i \geq T_{ij}^{D_{slowest}}} y_{it_i jt_j} \cdot C_{ij}^{D_{slowest}} \right)$$

Delay penalty:

$$\sum_{i,j} \left( \sum_{t_j - t_i < T_{ij}^{D_{fastest}}} \left( t_i + T_{ij}^{D_{fastest}} - t_j \right)^2 \cdot 2C_{max} \cdot y_{it_i jt_j} \right)$$

With the following auxiliary conditions:

Supply constrained: $\forall i : s_i(t_i) = \sum_{j,t_j} y_{it_i jt_j}$

Demand constrained: $\forall j : d_j(t_i) = \sum_{i,t_i} y_{it_i jt_j}$

Maximal delay constraint:

$\forall i,t_i,j,t_j : y_{it_i jt_j}$ defined $\Leftrightarrow t_i + T_{ij}^{D_{fastest}} - t_j \leq A_{jt_j}$

VARIABLES AND CONSTANTS

Free decision variables:

$y_{it_i jt_j}$=Part of the supply of plant i at time $t_i$ which is assigned to the demand of distribution center j at time $t_j$ Bound decision variables (R(t) to be maximized):

R(t)=Range of coverage of all distribution centers at time t $L_j(t)$=Target inventory in distribution center j at time t (depending on range of coverage R(t))

$s_i(t)$=Supply of node i(=plant) at time t $d_j(t)$=Demand for node j(=distribution center) at time t Input variables:

$P_i(t)$=Production rate in production plant i at particular time t $tr_j(t)$=Previously fixed supply (in transit) in distribution center or central warehouse j at particular time t $[L_i^{initial}=tr_i(0)$=Initial inventory in production plant i or distribution center i]

P=Demand priority P, P∈{$P_{high}$, ..., $P_{forecast}$}={1,2, 3, ...} with $P_{high}$=I< ... <$P_{forecast}$ $o_j^P(t)$=order (=aggregated demand) for priority class P for distribution center j at time t $m_j(t)$=Safety stock in distribution center j at time t D=Transportation mode D∈{slowest, ..., fastest}

$C_{ij}^D$=Transport cost for transport of a material unit with transportation mode D between nodes i and j $T_{ij}^D$=Transportation time for the transport of a material unit with transportation mode D between nodes i and j $D_{fastest}$=Fastest transportation mode: $\forall D,ij: T_{ij}^{D_{fastest}} \leq T_{ij}^D$ $D_{slowest}$=Slowest transportation mode: $\forall D,ij: T_{ij}^{D_{slowest}} \leq T_{ij}^D$ slower(D)=Next slowest transportation mode after transportation mode D: $\neg\exists D':[\forall i,j: T_{ij}^D \leq T_{ij}^{D'} < T_{ij}^{slower(D)}]$ $A_{jt_j}$=Maximum permitted delay of a demand from distribution center j to particular time $t_j$

ALGORITHMS

Now that the formulation of the problem is complete, the algorithm to be applied will be discussed. The basic idea of the algorithm is to mutate incrementally the range of the coverage profile R(t) until the optimal profile is reached. The basic structure of the algorithm comprises the following steps:

1. Initialize the range of coverage profile R(t) (e.g. R(t)= 1).
2. Compute the necessary inflows $d_j(t)$ in the demand nodes in order to fulfill profile constraints.
3. Construct the cheapest flow for these demands using any minimum cost flow algorithm.
4. If no solution is found, then lower the range of the coverage profile R(t), otherwise, increase the range of coverage profile R(t).
5. If the optimal solution is not find, go back to step 2.

Step 2 is the same for all algorithms as described in the sections above:

$$d_i(t) = \sum_P o_j^P(t) - tr_j(t) + L_j(t-1) - L_j(t)\}$$

$$L'_j(t, r) = m_j(t + r) + \sum_{\tau=t+1}^{t+r} \sum_P o_j^P(\tau)$$

Various alternatives to step 4 are proposed in the following section. The full problem is first discussed, i.e, the efficient construction of a maximal range of coverage profiles. This algorithm can be significantly speeded up by the restriction to a monotone range of coverage profiles which will be described later. Finally, a more sophisticated algorithm which uses a fast algorithm for monotone profiles for the maximization of the range of coverage.

A. MAXIMAL RANGE OF COVERAGE PROFILE

For constructing the maximal (integer) range of coverage profile, the actual profile is enlarged iteratively 1 whenever this is possible for each time step sweeping several times over the whole planning horizon.

Algorithm for step 4

```
While Profile_enlarged to begin
{Sweep over the planning horizon}
enlarged = false;
for all t (planning_horizon do begin
    R(t):=R(t)+1;                                    {enlarge R}
    Generate min_cost_flow problem F(R) for profile R(t) {=step 2}
    If min_cost_flow (F(R)) solvable
        then enlarged = true
        else R(t):=R(t)-1                            {reset};
    end;
end;
```

The generalization for enlarging the profile by a smaller granularity $\Delta<1$ instead of 1 is straight forward:
Algorithm of step 4 with granularity $\Delta$ for profile R

```
While Profile_enlarged to begin
    {Sweep over the planning horizon}
    enlarged = false;
    for all t ≤ planning_horizon do begin
        R(t):=R(t)+ Δ;                                    {enlarge R}
        Generate min_cost_flow problem F(R) for profile R(t) {=step2}
        it min_cost_flow (F(R)) solvable
            then enlarged = true
            else R(t):=R(t)-Δ                             {reset};
    end;
end;
```

B. MAXIMAL MONOTONE RANGE OF COVERAGE PROFILES

The basic idea is to solve the problem by induction:
Initialize with an empty profile
Construct a solution for t time steps and enhance this solution to one for t+1 time steps.
Iterate until t=Planning horizon.
Algorithm for step 4

```
Initialize R(t):     ∀t:R(t)=0
t=t₀, {Planning_Start}
While t < planning_horizon do begin
    {Induction Step}
    R(t+1)=R(t);
    Generate min_cost_flow problem F(R) for profile R(t)   {=step2}
    If min_cost_flow (F(R)) solvable
    Then Begin                                  {enlarge R(t+1)}
        Repeat
            R(t+1):=R(t+1)+1;
            Generate min_cost_flow problem F(R) for profile R(t)
        Until min_cost flow (F(R)) not solvable
        R(t+1):=R(t+1)-1                                {reset}
    End
    Else                                                {lower R}
        Repeat
            R^max=R(t+1)
            t_R=min{t|R(t) =R^max − 1};
            ∀t'>t_R:R(t')=R^max − 1;
            Generate min_cost_flow problem F(R) for profile R(t)
        Until min_cost_flow (F(R)) solvable
```

Algorithm for step 4-monotone range of coverage profiles with granularity $\Delta$
The generalization for enlarging the profile by a smaller step $\Delta<1$ instead of 1 is straight forward:

```
Initialize R(t):     ∀t:R(t)=0
                     t=t₀; {Planning_Start}
While t < planning_horizon do begin
                     {Induction Step}
R(t+1)=R(t);
Generate min_cost_flow problem F(R) for profile R(t)   {= step 2}
If min_cost_flow (F(R)) solvable
Then Begin                                  {enlarge R(t+1)}
    Repeat
        R(t+1):=R(t+1)+ Δ;
        Generate min_cost_flow problem F(R) for profile R(t)
    Until min_cost_flow (F(R)) not solvable
    R(t+1):=R(t+1)- Δ                               {(reset)}
    End
Else                                                {lower R}
```

```
-continued
Repeat
    R^max:=R(t+1);
    t_R=min{t'|R(t')>R^max− Δ}
    ∀t'≥t_R: R(t')=R^max− Δ;
    Generate min_cost_flow problem F(R) for profile R(t)
Until min_cost_flow (F(R)) solvable
```

C. EFFICIENCY IMPROVEMENT FOR ROLLING PLANNING SCHEME

For the rolling planning scenario the planner needs only to know, where to ship the production for planning_start_ time $t_0$, i.e., the shipment planning $y_{it_0 j t_j}$ for time $t_0$ should be extensible to an optimal planning, however, the shipment planning for the following time steps may be not optimal. They will be corrected by moving the planning window. Remind that we keep as an invariant, that the planning is always extensible to an optimal profile but optimal for the first time step.

In the following we restrict the profiles on the following type: Even until the maximal transportation time $t_{max}$ and constant after $t_{max}$. As long as this monotone profile is not solvable we lower the last constant function part.

Algorithm for step 4-rolling planning scheme
Given maximal transportation time $t_{max}$
Compute the maximal monotone range of coverage profile $R^{max}(t)$ for the restricted planning window [planning_start, planning_start+$t_{max}$];

```
Initialize R(t):{constant continuation of R}
    ∀t≤t_max:R(t)=R^max(t)
    ∀t>t_max:R(t)=R^max(t_max);
    R^max:=R^max(t_max);          {adjust last constant part of R}
Generate min_cost_flow problem F(R) for profile R(t)
While min_cost_flow(F(R)) not solvable do begin
    t_R=min{t|R(t)≥R^max−1}
    ∀t≥t_R:R(t) =R^max−1;
    R^max=R^max−1;
    Generate min_cost_flow problem F(R) for profile R(t)
End;
```

GENERALIZATIONS

For constructing rational capacity profiles we have to limit the granularity $\Delta$ of the possible values for range of coverage profile R(t). When the granularity $\Delta$ is small, there are many iterations necessary until the maximal profile is found. In the following sections we describe how the search for maximal monotone profiles can be speeded up by binary search.

1. BINARY SEARCH FOR MAXIMAL MONOTONE PROFILES

In the algorithm for maximal monotone range of coverage profiles with granularity $\Delta$ we consider two parts "enlarge R(f)" and "lower R(t)". In both cases we speed up the search for the optimal tuning of the last constant part of the capacity profile using binary search. We describe in the following a straight forward augmentation of our algorithm by binary search. Alternative variants are omitted for the sake of clarity (e.g. starting the granularity δ of the binary search with values learned by experience instead of the smallest possible value Δ=Δ)

ALGORITHM FOR STEP 4-MONOTONE RANGE OF COVERAGE PROFILES WITH GRANULARITY Δ (BINARY SEARCH)

```
Initialize R(t):        ∀t:R(t)=0
                        t=t₀; {Planning_Start}
While t < planning_horizon do begin
    {Induction Step}
    R(t+1)=R(t);
    Generate min_cost_flow problem F(R) for profile R(t)    {=step 2}
    If min_cost_flow (F(R)) solvable
    Then Begin                                              {enlarge R(t+1)}
    δ:=Δ
    Repeat                                                  {binary search-enlarge δ}
        R(t+1):=R(t+1)+δ
        δ:=2*δ;
        Generate min_cost_flow problem F(R) for profile R(t)
    Until min_cost_flow (F(R)) not solvable
    Repeat                                                  {binary search-lower δ}
        R(t+1):=R(t+1)+δ;
        δ:-δ/2;
        Generate min_cost_flow problem F(R) for profile R(t)
        If min_cost_flow (F(R)) solvable
            Then δ:=|δ|
            Else δ:=−|δ|
    Until |δ|=Δ;
    If min_cost_flow (F(R)) not solvable
        Then R(t+1):=R(t+1)−δ
    End
Else                                                        {lower R}
Repeat                                                      (binary search-enlarge δ)
    R^max:=R(t+1);
    δ:=2*δ;
    t_R=min{t'|R(t')≧R^max−δ}
    ∀t'≧t_R:R(t')=R^max−δ;
    Generate min_cost_flow problem F(R) for profile R(t)
Until min_cost_flow (F(R)) solvable
Repeat                                                      {binary search-lower δ}
    R^max:=R(t+1);
    δ:=δ/2;
    t_R=min{t'|R(t)≧R^max+δ}
    ∀t'≧t_R:R(t')=R^max+δ;
    Generate min_cost_flow problem F(R) for profile R(t)
    If min_cost_flow (F(R)) solvable
        Then δ:=|δ|
        Else δ:=−|δ|
Until |δ|=Δ;
If min_cost_flow (F(R)) not solvable
    Then ∀t'≧t_R: R(t')=R^max−δ;
End
```

```
Initialize R(t):
    ∀t≦t_max:R(t)=R^max(t)
    t>t_max:R(t)=R^max(t_max):
R^max:=R^max(t_max)
```

2. BINARY SEARCH FOR ROLLING PLANNING SCHEME

The enhancement of the algorithm for the rolling planning scheme is similar to these of the preceding section. Since we have not to consider the enlargement of the range of coverage profile it suffices to insert the augmentation of the second part of that algorithm ("lower R"). More sophisticated alternatives are omitted for the sake of clarity.

ALGORITHM FOR STEP 4-ROLLING PLANNING SCHEME

Given maximal transportation time $t_{max}$.

Compute with binary search the maximal monotone range of coverage profile $R^{max}(t)$ for the restricted planning window [planning_start, planning_start+$t_{max}$];

-continued

```
Generate min_cost_flow problem F (R) for profile R(t)    {=step2}
Repeat                                                   {binary search-enlarge δ}
    R^max:=R(t_max);
    δ:=2*δ;
    t_R=min{t'|R(t')≧R^max+δ}
    ∀t'≧t_R:R(t')=R^max+δ;
    Generate min_cost_flow problem F(R) for profile R(t)
Until min_cost flow (F(R)) solvable
Repeat                                                   {binary search-lower δ}
    R^max:=R(t_max);
    δ:=δ/2;
    t_R=min{t'|R(t'))≧(R^max+δ}
    ∀t'≧t_R:R(t')=R^max+δ;
    Generate min_cost_flow problem F(R) for profile R(t)
    If min_cost_flow (F(R)) solvable
    Then δ:=|δ|
    Else δ:=−|δ|
```

-continued

```
Until |δ|=Δ;
    If min_cost_flow (F(R)) not solvable
        Then ∀t≧t_max;R(t):=R^max-Δ
End
```

3. A FAST ALGORITHM FOR NON MONOTONOUS RANGE OF COVERAGE PROFILE

We have already described an algorithm for the maximization of the non monotonous range of coverage profiles (see section A above). This approach could be very slow, if we use a fine granularity $\Delta$. In the following we propose a more sophisticated algorithm using the algorithm for monotone range of coverage profiles (see section B above) as basic building block. The basic idea is to solve the problem recursively:

1. Generate a maximal monotone range of coverage profile $R^m$.
2. Reduce the problem by fixing the parts of this profile which have to be the same for the maximal range of coverage profile R.
3. If not the whole profile is fixed, then go back to step 1 (and solve the remaining part).

For step 2 we have to select the time steps t where $$R^m(t)<R^m(t+1)=>R^m(t)=R(t)$$

i.e., the strongly monotone increasing parts of the maximal monotone range of coverage profile can be fixed. Moreover, the end of the planning horizon can be fixed also:

$$R^m(\text{planning\_end})=R(\text{planning\_end})$$

Therefore, we can reduce the planning window at least by 1 (eventually more, when we can reduce also some fixed strongly monotone increasing parts of $R^m$. Thus we may conclude that the above loop will be repeated at most T steps where T=planning_end-planning_start (number of time steps in the planning window), i.e., the time complexity is bound by $T*O(R^m)$ where $O(R^m)$ is the time complexity of the algorithm for the maximal monotone range of coverage profile. In other words, the algorithmic complexity increases at most by a factor T compared to monotone profiles.

I claim:

1. A method for maximizing a range of coverage profiles for managing inventory comprising the steps of:
   a. providing a function for a range of coverage profile;
   b. initializing said range of coverage profile function with a starting value;
   C. calculating an optimal amount of inventory to fulfill said function for a range of coverage profile wherein said calculating comprises the steps of:
      i. applying a minimum-cost flow algorithm to construct an optimal transportation solution to transport said necessary amount of inventory;
      ii. determining whether a solution is found after said applying of said minimum-cost flow algorithm for said range of coverage profile function with said starting value;
      iii. incrementally lowering said starting value when said determining whether a solution is found yields no solution and repeating said computing an optimal solution until said computing an optimal solution results in an optimal solution for said minimum-cost flow algorithm;
   d. incrementally enlarging said starting value when said determining whether a solution is found yields a solution and repeating said computing a solution until said computing an optimal solution results in an optimal solution for said minimum-cost flow algorithm;
   e. managing inventory based upon said optimal solution.

2. A method for maximizing a range of coverage profiles of claim 1 further comprising the steps of:
   a. interfacing with an online transactional processing system;
   b. reading transactional data from said online transactional processing system; and
   c. inputting said transactional data into said range of coverage profile function.

3. A computer-readable medium having stored thereon a plurality of instructions, said plurality of instructions including instruction which, when executed by a processor, cause said processor to perform the steps of:
   a. interfacing with an online transactional processing system;
   b. reading transactional data from said online transactional processing system;
   c. inputting said transactional data into a function for a range of coverage profile;
   d. initializing said function for a range of coverage profile with a starting value;
   e. calculating a necessary amount of inventory to fulfill said function for a range of coverage profile;
   f. computing an optimal solution wherein said computing comprises the steps of:
      i. applying a minimum-cost flow algorithm to constrict an optimal transportation solution to transport said necessary amount of inventory;
      ii. determining whether a solution is found after said applying of said minimum-cost flow algorithm for said range of coverage profile function with said starting value;
      iii. incrementally lowering said starting value when said determining whether a solution is found yields no solution and repeating said computing an optimal solution until said computing an optimal solution results in an optimal solution for said minimum-cost flow algorithm;
   g. incrementally enlarging said starting value when said determining whether a solution and repeating said computing a solution until said computing an optimal solution results in an optimal solution for said minimum-cost flow algorithm;
   h. outputting said optimal solution to manage inventory.

4. A system for maximizing a range of coverage profiles for managing inventory comprising:
   a. means for interfacing with an online transactional processing system;
   b. means for reading transactional data from said online transactional processing system;
   c. means for inputting said transactional data into a function for range of coverage profile;
   d. means for initializing said function for a range of coverage profile function with a starting value;
   e. means for calculating a necessary amount of inventory to fulfill said function for range of coverage profile;
   f. means for computing an optimal solution wherein said computing comprises:

i. means for applying a minimum-cost flow algorithm to construct an optimal transportation solution to transport said necessary amount of inventory;
ii. means for determining whether a solution is found after said applying of said minimum-cost flow algorithm for said range of coverage profile function with said starting value;
iii. means for incrementally lowering said starting value when said determining whether a solution is found yields no solution and repeating said computing an optimal solution until said computing an optimal solution results in an optimal solution for said minimum-cost flow algorithm;

g. means for incrementally enlarging said starting value when said determining whether a solution is found yields a solution and repeating said computing a solution until said computing an optimal solution resulting in an optimal solution for said minimum-cost flow algorithm wherein said optimal solution is utilized to manage inventory.

* * * * *